US005851045A

United States Patent [19]
Muramatsu

[11] Patent Number: 5,851,045
[45] Date of Patent: Dec. 22, 1998

[54] WINDOW FRAME ATTACHMENT STRUCTURE FOR A WINDOW

[75] Inventor: Kazushige Muramatsu, Shizuoka-Ken, Japan

[73] Assignee: Suzuki Motor Corporation, Japan

[21] Appl. No.: 759,969

[22] Filed: Dec. 3, 1996

[30] Foreign Application Priority Data

Jan. 29, 1996 [JP] Japan .................................. 8-012702

[51] Int. Cl.⁶ ........................................................ B60J 1/02
[52] U.S. Cl. .................. 296/96.21; 296/39.1; 296/146.2; 296/146.8; 296/201
[58] Field of Search ................................ 296/201, 96.21, 296/39.1, 146.2, 146.8; 52/208

[56] References Cited

U.S. PATENT DOCUMENTS 5,531,496  7/1996  Zbinden et al. .................... 296/96.21
5,702,146  12/1997  Asami .................................. 296/96.21
5,711,119  4/1998  Cornils et al. ............................ 52/208

FOREIGN PATENT DOCUMENTS 55-114612  9/1980  Japan .................................. 296/96.21
57-138776  2/1984  Japan .................................. 296/96.21

*Primary Examiner*—D. Glenn Dayoan
*Assistant Examiner*—Clovia Hamilton
*Attorney, Agent, or Firm*—Morrison Law Firm

[57] ABSTRACT

A window frame attachment structure uses a projection affixed to a window fitting into a cut-out in the window frame for guiding installation of the window. A pair of ribs spaced above either side of the projection permit an installer to view the fitting of the projection into the cut-out. After installation, an interior trim is pulled over the positioning member to rest on the ribs, thereby hiding the positioning member. The edge of the trim is thickened to form a lip which rests on the ribs.

12 Claims, 4 Drawing Sheets

WINDOW FRAME ATTACHMENT STRUCTURE FOR A WINDOW

BACKGROUND

The present invention relates to a window frame attachment structure for a window which facilitates mounting a window onto a window frame. More particularly, the present invention relates to a window frame attachment structure for attaching an automobile window onto an automobile window frame. The window frame attachment structure has a positioning member for mounting automobile window onto the automobile window frame and an interior trim for covering the window frame and a related positioning member.

A conventional automobile includes a rear door having a window frame therein. A window is mounted externally against the window frame to provide rear visibility in the automobile. A positioning member aids alignment of the window with the window frame during window installation. After window installation, an upper edge of an interior trim mounted to the rear door is pulled toward the window over the positioning member. As a result, the interior trim covers the positioning member. Accordingly, the appearance of the interior of the vehicle is improved since the positioning member is hidden from view.

A problem encountered during window installation is that the flexibility of the interior trim leaves some uncertainty in the location of the interior trim. Sometimes, the upper edge of the interior trim may extend too far outward so that, when the window is moved into position for installation, contact between the window and the window frame hides the positioning member.

A problem encountered after window installation is that the positioning member is exposed if the upper edge of the interior trim sags down. As can readily be appreciated, exposing the positioning member detracts from the appearance of the interior of the vehicle.

OBJECTS AND SUMMARY OF THE INVENTION

It is an object of the invention to provide a window frame attachment structure for a window which overcomes the drawbacks of the prior art.

It is another object of the invention to provide a window frame attachment structure for a window which prevents the upper edge of the interior trim from coming into contact with the window during installation.

It is a further object of the invention to provide a window frame attachment structure for a window which prevents the upper edge of the interior trim from sagging downward and exposing the positioning member.

It is a still further object of the invention to provide a method for mounting a window to a window frame which allows easy positioning of the interior trim that covers the interior side of a window frame.

Briefly stated, the present invention provides a window frame attachment structure that uses a projection affixed to a window fitting into a cut-out in the window frame for guiding installation of the window. A pair of ribs spaced above either side of the projection permit an installer to view the fitting of the projection into the cut-out. After installation, an interior trim is pulled over the positioning member to rest on the ribs, thereby hiding the positioning member. The edge of the trim is thickened to form a lip which rests on the ribs.

According to an embodiment of the invention, there is provided a window frame attachment structure for a vehicle comprising: a window frame, the window frame including a member having a cut-out in an upper edge thereof, a positioning member for mounting a window, an inwardly directed projection on the positioning member, at least one rib on the positioning member, the rib being located above the projection, the rib being positioned and shaped to permit an installer to observe from above fitting of the projection into the cut-out, the rib having an upper surface extending inward, generally parallel to the projection, an interior trim in the vehicle, and the interior trim being fittable over the positioning member to rest on the rib, whereby the positioning member is hidden.

According to a feature of the invention, there is provided a window frame attachment structure for a window comprising: a window frame, the window frame including a U-shaped cut-out in an upward-facing edge thereof, a positioning member, a base plate of the positioning member for attachment to the window, a projection extending inward from the base plate through the U-shaped cut-out, first and second ribs formed above the projection and extending from the base plate parallel to the projection, the first and second ribs being spaced apart on either side of the projection to permit an installer to see the projection and the cut-out during the installation, and an interior trim having an upper edge mounted on the first and second ribs of the positioning member such that the interior trim covers the window frame and the positioning member.

According to a further feature of the invention, there is provided a window frame attachment structure for a window of a vehicle comprising: a window frame having a U-shaped cut-out formed on an interior edge, a positioning member for mounting the window on the window frame, a base plate on the positioning member for attachment to the window, a projection extending from the base plate fittable into the U-shaped cut-out for guiding installation of the window on the window frame, first and second ribs above the projection and extending parallel to the projection, the first and second ribs being spaced apart on either side of the projection to permit an installer to see the projection and the cut-out during installation, an interior trim in the vehicle, the interior trim including an upper edge having a lip movable to rest on the first and second ribs to hide the positioning member, and the lip having a thickness greater than an adjacent portion of the interior trim.

According to a still further feature of the invention, there is provided a method for mounting a window to a window frame, comprising: forming a cutout in the window frame, attaching a base plate of a positioning member to the window, aligning a projection extending from the base plate with the cut-out, mounting the window on the window frame so that the projection extends through the cut-out, precisely positioning the window on the window frame by viewing the projection through an alignment gap provided between first and second ribs extending from the base plate towards the window frame, fixing the window on the window frame, and pulling a lip of an upper edge of an interior trim to rest on the first and second ribs, whereby the positioning member is hidden.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 4:
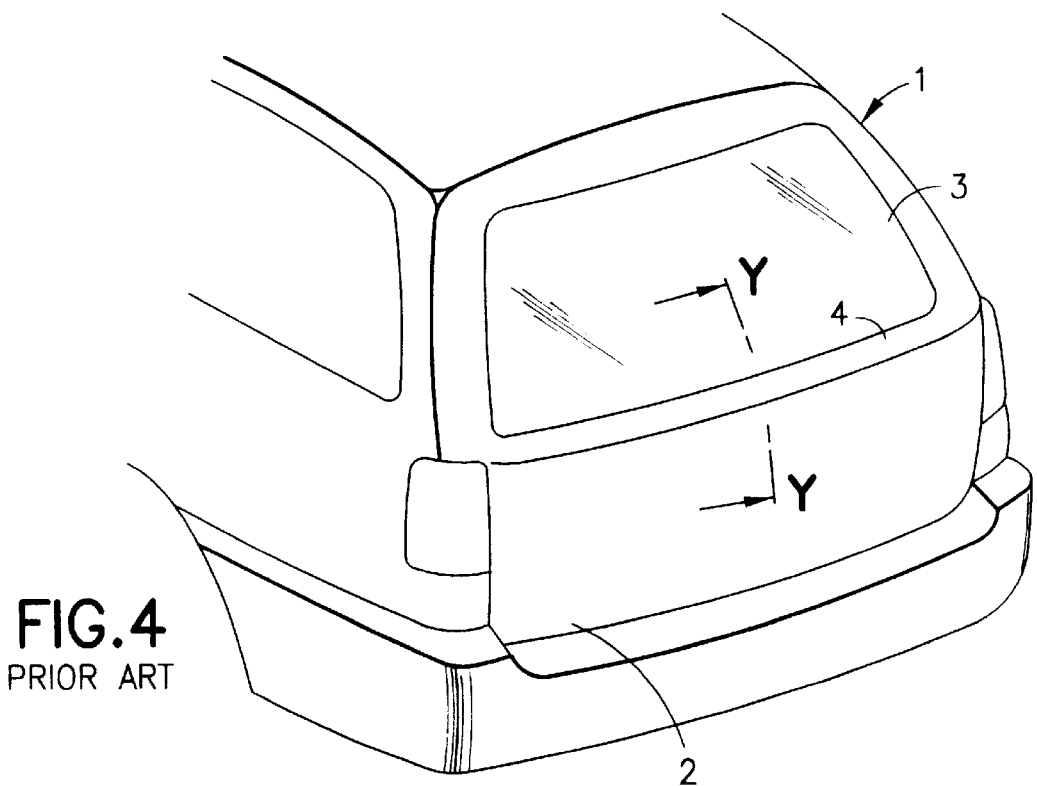
FIG. 4 is a perspective view of a window mounted in a rear door of an automobile.

Referring to FIG. 4, a conventional automobile 1 includes a rear door 2 having a window frame 4 therein. A window 3 is mounted externally against window frame 4 to provide rear visibility in automobile 1. Window 3 is preferable made of a transparent material such as glass.

Figure 5:
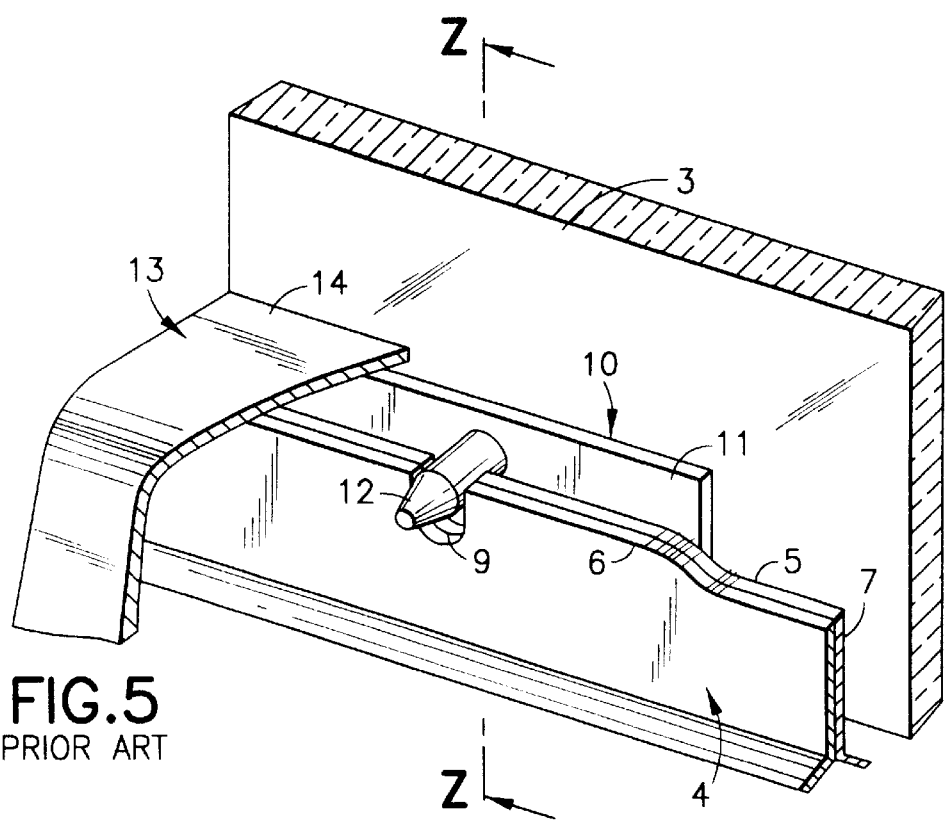
FIG. 5 is a perspective view, partially in section, showing a window frame attachment structure.

Referring now to FIG. 5, one option for a window frame attachment structure for automobile 1 includes an outer panel 5 and an inner panel 6 together forming window frame 4. Outer panel 5 and inner panel 6 are abutted face to face to form a flange 7. A U-shaped cut-out 9 is disposed in the upper edge of flange 7.

A positioning member 10 aids alignment of window 3 with window frame 4 during installation. Positioning member 10 includes a base plate 11 attached near the lower edge of window 3 and centered laterally in window 3. A cylindrical projection 12, located generally in the transverse center of window 3, is integrally formed with base plate 11, facing away from window 3. Cylindrical projection 12 extends through U-shaped cut-out 9 of window frame 4. Cylindrical projection 12 is tapered at its free end to guide cylindrical projection through U-shaped cut-out 9. The cooperation of cylindrical projection 12 and U-shaped cut-out 9 ensures that window 3 is properly aligned with window frame 4.

Figure 6:
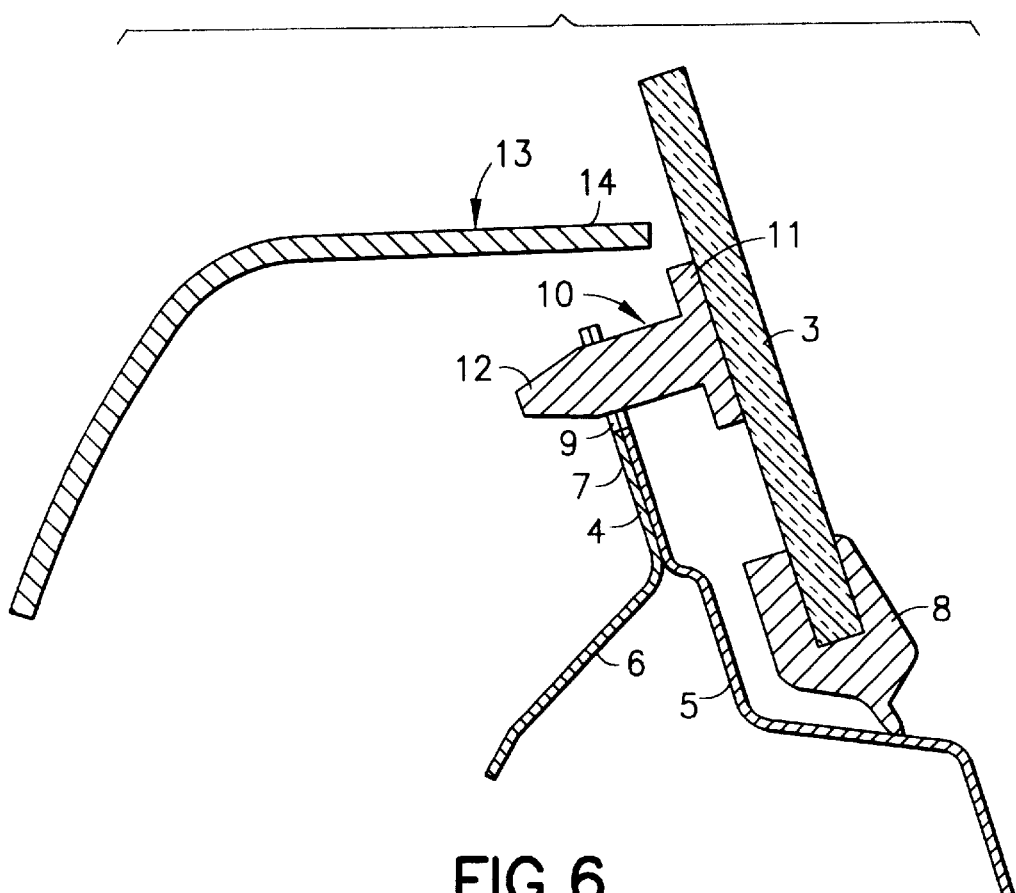
FIG. 6 is a cross-sectional view taken along line Y—Y in FIG. 4 and line Z—Z in FIG. 5.

Referring now also to FIG. 6, window frame attachment structure further includes an interior trim 13. Interior trim 13 includes an upper edge 14 which, when fully installed, terminates a short distance from window 3, as shown. A lower edge of window 3 is embraced by a molding 8. Although not shown in the drawings, molding 8 may continue around the remainder of window 3. Window 3 is secured by conventional means which urges an edge of molding 8 into sealing contact with a surface of outer panel 5 to exclude moisture and dirt.

Prior to installing rear window 3, interior trim 13 is mounted on a lower interior portion of door 2 (not shown in FIG. 6). The outer edge of interior trim is left a small distance short of its final position. Base plate 11 is attached adjacent the edge, and generally in the lateral center of window 3. Window 3 is mounted to window frame 4 guided by cylindrical projection 12 of positioning member 10 extending through U-shaped cut-out 9 of window frame 4. Window 3 is then fixed to outer panel 5, compressing molding 8. Finally, the edge of an upper portion 14 of interior trim 13 is pulled toward window 3 over flange 7 and positioning member 10. As a result, interior trim 13 covers flange 7 and positioning member 10. Accordingly, the appearance of the interior of the vehicle using window frame structure is improved since flange 7 and positioning member 10 are hidden from view.

While above window frame attachment structure improves the appearance of the interior of a vehicle, one shortcoming of above window frame attachment structure is that the flexibility of interior trim 13 leaves some uncertainty in the initial location of the outer edge of interior trim 14. Sometimes, the outer edge of interior trim 13 may extend too far outward so that, when window 3 is moved into position for installation, contact between window 3 and the outer edge of interior trim 14 hides cylindrical projection 12 and/or U-shaped cut-out 9. This positioning may also result in attempting to install window 3 with cylindrical projection 12 contacting an upper surface of upper edge 14 of interior trim 13.

An additional shortcoming of above window frame attachment structure is that even after window 3 is mounted on window frame 4 flange portion 7 and positioning member 10 are exposed if upper edge 14 sags downward. As can readily be appreciated, exposing flange portion 7 and positioning member 10 detracts from the appearance of the interior of the vehicle.

Figure 1:
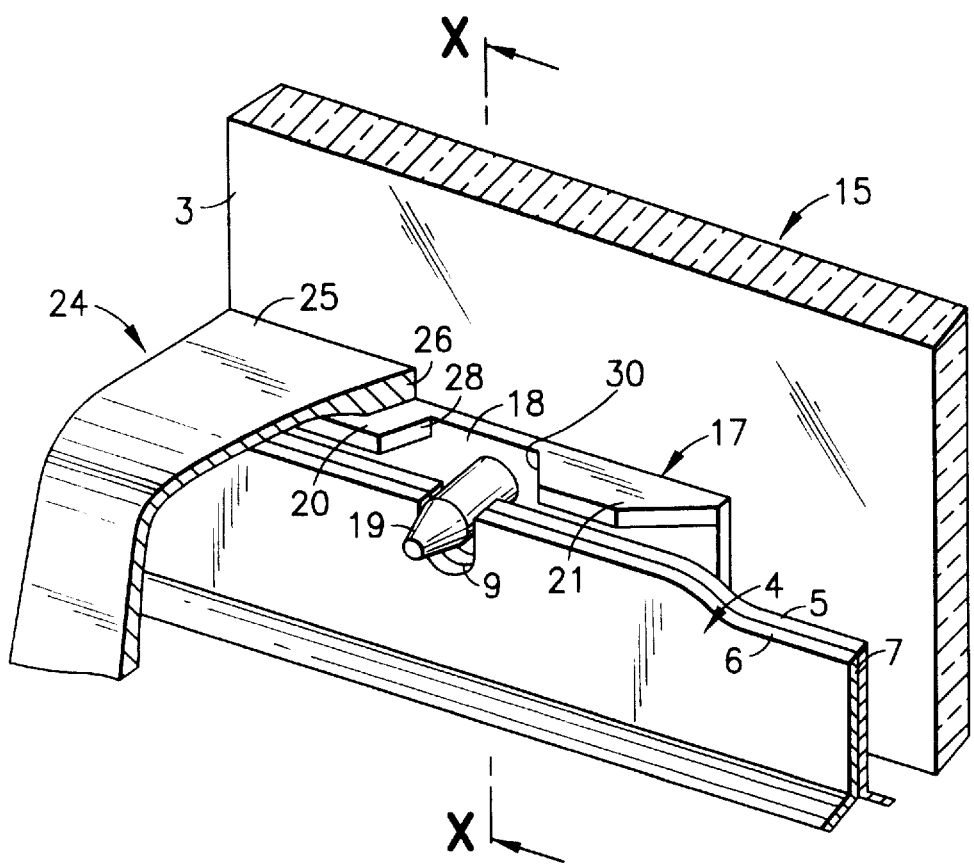
FIG. 1 is a perspective view, partially in section, showing the window frame attachment structure according to an embodiment of the present invention.

Referring to FIG. 1, a window frame attachment structure 15 of the present invention includes a window frame 4 having an outer panel 5 and an inner panel 6. Outer panel 5 and inner panel 6 are affixed face to face to form a flange 7. A U-shaped cut-out 9 opens upward generally centered in flange 7. A positioning member 17 is affixed centered laterally on the inner surface of window 3. Positioning member 17 includes a base plate 18 which provides an attachment surface for fixing positioning member 17 to window 3. A cylindrical projection 19 extends from the center of base plate 18. When window 3 is installed, cylindrical projection 19 extends through U-shaped cut-out 9. A lower portion of interior trim 24 is then attached to rear door 2 through conventional means such as screws, tacks or the like (not shown). This cooperation of cylindrical projection 19 and U-shaped cut-out 9 ensures that window 3 is properly aligned with window frame 4 during mounting, as previously described. Cylindrical projection 19 is tapered at its free end to guide insertion of cylindrical projection 19 into U-shape cut-out 9.

Figure 3:
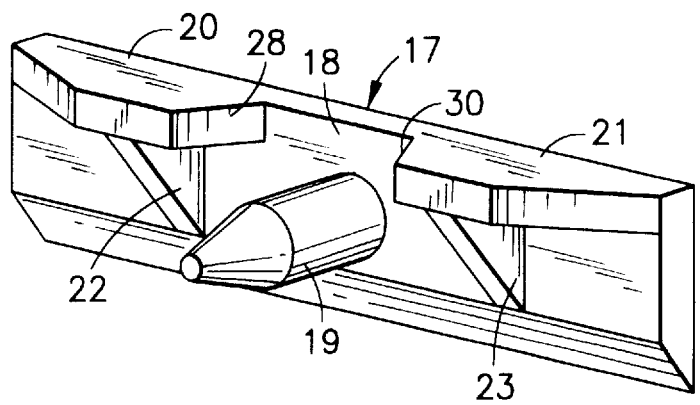
FIG. 3 is a perspective view of a positioning member of FIG. 1.

Referring momentarily to FIG. 3, ribs 20 and 21 are integrally formed at an upper edge of base plate 18, extending perpendicularly from base plate 18 above projection 12 away from window 3. Inner edges 28 and 30 of ribs 20 and 21 are beveled outward to provide an installer a clear view of projection 19 and of U-shaped cut-out 9 which the installer is attempting to interfit. Outer edges of ribs 20 and 21 may also be bevelled. Reinforcing ribs 22 and 23 are integrally formed below ribs 20 and 21, respectively, to improve the rigidity of ribs 20 and 21.

Figure 2:
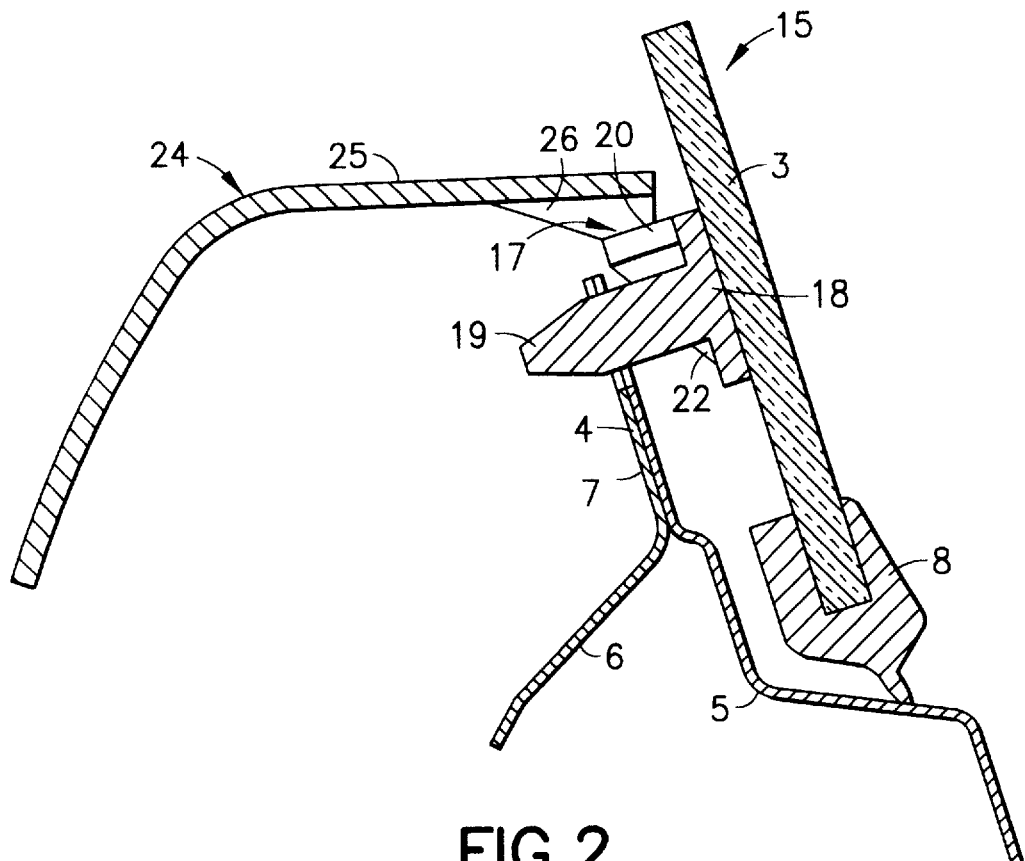
FIG. 2 is a cross-sectional taken along line X—X in FIG. 1.

Returning now to FIG. 1, in conjunction with FIG. 2, an interior trim 24 is thickened at its outer edge to form a lip 26 below its outer edge. When the outer edge of interior trim 24 is pulled outward to cover positioning member 17, lip 26 rest upon the upper surfaces of ribs 20 and 21. The greater thickness of lip 26, compared to the thickness of interior trim 24, facilitates an installer's ability to easily maneuver upper edge 25 of interior trim 24 during installation. Thus mounting failures caused by excessive bending of upper edge 25 of interior trim 24, which tends to hide projection 19 and/or U-shaped cut-out 9, are avoided. If, after installation, interior trim 24 is accidentally forced downward by, for example, cargo in automobile 1, the presence of reinforcing ribs 22 and 23 protect ribs 20 and 21 from bending or breakage.

Accordingly the present invention allows easy positioning of interior trim 24 by mounting lip 26 of upper edge 25 onto ribs 20 and 21 of positioning member 17 followed by attaching of lower portion of interior trim 24 onto rear door 2. Furthermore, once interior trim 24 is mounted onto rear door 2 upper edge 25 of interior trim 24 remains mounted on ribs 20 and 21 of positioning member 17 thereby preventing upper edge 25 from sagging down and exposing frame 4 and positioning member 17.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

For example, in lieu of cut-out 9 formed in window frame 4 an aperture which extends through window frame 4 may be provided. As a result, window 3 is aligned with window frame 4 when cylindrical projection 19 of positioning member 17 extends through the aperture. Additionally, upper edge 25 of interior trim 24 may have a plurality of lips in lieu of lip 26. As a result, one lip or a plurality of lip can be mount to each rib 20, 21. Alternatively, lip 26 could be aligned with ribs 20 and 21 so that lip 26 is mounted between ribs 20, 21. Furthermore, in lieu of ribs 20 and 21 a single rib or a plurality of ribs of alternative shapes may be provided.

What is claimed is:

1. A window frame attachment structure for a vehicle comprising:

a window frame;

said window frame including a member having a cut-out in an upper edge thereof;

a positioning member fixedly mounted on a surface of a window;

an inwardly directed projection on said positioning member;

at least one rib on said positioning member;

said at least one rib being located above said projection;

said at least one rib having an upper surface extending inward, generally parallel to said projection;

an interior trim in said vehicle; and said interior trim being fittable over said positioning member to rest on said at least one rib, whereby said positioning member supports said trim.

2. A structure according to claim 1, wherein:

said positioning member includes a base plate for attachment to said window;

said at least one rib being a first rib at a first side of said projection and a second rib at a second side of said projection;

said projection extending from said base plate through said cut-out; and said projection being visible from above between said first and second rib, whereby an installer is enabled to have visual guidance for fitting said projection into said cutout during installation of said window in said window frame.

3. A structure according to claim 1, wherein:

said at least one rib includes first and second ribs, said first and second ribs being spaced apart from each other above opposite sides of said projection.

4. A structure according to claim 3, wherein facing edges of said first and second ribs are beveled outward to permit said installer to see said projection and said cut-out during installation of said window.

5. A structure according to claim 1, wherein an upper edge of said interior trim includes a lip having a greater thickness than said an adjacent portion of said interior trim, said lip being a portion of said interior trim resting on said at least one rib.

6. A structure according to claim 1, wherein said cut-out is U-shaped, with an opening of the U facing upward for receiving said projection.

7. A structure according to claim 1, wherein an interior edge of said window frame includes said cut-out.

8. A window frame attachment structure for a window comprising:

a window frame;

said window frame including U-shaped cut-out in an upward-facing edge thereof;

a positioning member;

a base plate on said positioning member;

said base plate being fixedly attached to a surface of said window;

a projection extending inward from said base plate through said U-shaped cut-out;

at least a first rib formed above said projection and extending from said base plate parallel to said projection;

said at least a first rib being positioned to one side of said projection to permit an installer to see fitting of said projection into said cut-out during said installation; and an interior trim having an upper edge supported on said at least a first rib of said positioning member such that said interior trim hides said positioning member.

9. A structure according to claim 8, wherein:

said at least a first rib including at least first and second ribs;

said second rib being positioned at a second side of said projection;

said first and second ribs have facing edges which are bevelled outward to enable an installer to see said U-shaped cut-out and said projection for fitting of said projection into said U-shaped cut-out during installation of said window.

10. A structure according to claim 8, wherein said upper edge of said interior trim includes a lip having a greater thickness than said interior trim, said lip being supported on said first and second ribs.

11. A window frame attachment structure for a window of a vehicle comprising:

a window frame having a U-shaped cut-out formed on an interior edge;

a positioning member for mounting said window on said window frame;

a base plate on said positioning member for attachment fixedly to a surface of said window;

a projection extending from said base plate fittable into said U-shaped cut-out for guiding installation of said window on said window frame;

at least a first rib above said projection and extending parallel to said projection;

said first rib being positioned to one side of said projection to permit an installer to see said projection and said cut-out during said installation;

an interior trim in said vehicle; and said interior trim including an upper edge movable to rest on said at least a first rib to support said interior trim and to hide said positioning member.

12. A method for mounting a window to a window frame, comprising:

forming a cutout in said window frame;

attaching a base plate of a positioning member to a surface of said window;

aligning a projection extending from said base plate with said cut-out;

mounting said window on said window frame so that said projection extends through said cut-out;

precisely positioning said window on said window frame by viewing said projection through an alignment gap provided between first and second ribs extending from said base plate towards said window frame;

fixing said window on said window frame; and pulling a lip of an upper edge of an interior trim to rest on said first and second ribs, whereby said interior trim is supported and said positioning member is hidden.

* * * * *